(12) United States Patent
Strodtbeck

(10) Patent No.: US 6,438,160 B1
(45) Date of Patent: Aug. 20, 2002

(54) METHOD AND APPARATUS FOR ESTIMATING AN ERROR RATE IN A DIGITAL COMMUNICATION SYSTEM

(75) Inventor: Andrew L. Strodtbeck, El Segundo, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/310,472

(22) Filed: May 12, 1999

(51) Int. Cl.[7] .............................................. H04B 17/00
(52) U.S. Cl. ....................................... 375/228; 714/704
(58) Field of Search ................................. 375/228, 224, 375/225; 370/241, 242; 714/704, 705

(56) References Cited

U.S. PATENT DOCUMENTS 5,490,148 A * 2/1996 Carson ........................ 375/298

* cited by examiner

Primary Examiner—Stephen Chin
Assistant Examiner—Kevin Kim
(74) Attorney, Agent, or Firm—Terje Gudmestad

(57) ABSTRACT

An apparatus for estimating an error rate in a digital communication system is provided. A satellite ground station or a user satellite transmits a digital data stream to a relay satellite. The relay satellite calculates an error rate associated with the data stream by sanding one or more bits of the data to an error rate estimator. Each bit sent to the error rate estimator is delayed, inverted, and exclusive-ored (XOR) with the next bit in the data sequence. By averaging the output of the exclusive-or an analog representation (i.e., a moving average) of the error rate is produced. The analog estimate may then be converted to a digital signal. The error rate estimate may be returned to an equalizer within the relay's demodulator, thereby allowing the on-board equalizer to tune the demodulator for a minimum error rate. The error rate estimate may also be multiplexed into the spacecraft telemetry system. Once received by a receiver station, the telemetered error rate information can be used to monitor link quality or to tune distortion mitigation systems on the relay or at the transmit site.

20 Claims, 4 Drawing Sheets

METHOD AND APPARATUS FOR ESTIMATING AN ERROR RATE IN A DIGITAL COMMUNICATION SYSTEM

TECHNICAL FIELD OF THE INVENTION

The present invention relates in general to estimating error rates in digital communication systems and in particular to estimating error rates using the filtered output of a predetermined pattern that has been delayed, inverted and exclusive-ored with itself.

BACKGROUND OF THE INVENTION

Wireless communication systems are susceptible to a wide variety of interference sources. As a result, various schemes to encode error correction data and estimate error rates are commonly employed. By estimating the current error rate associated with a transmission, systems can adaptively adjust relevant equalization systems in order to optimize performance.

Typically systems will transmit a known test pattern and determine what portion of the known test pattern is in error at the receiving end. However, in systems employing a regenerative relay device, such as a satellite with on-board remodulation and demodulation, the estimate is an end-to-end estimate. These ground-based measurements are inadequate because it is difficult to separate user-to-relay link performance from variations in the space-to-ground link. Current systems may transmit a known test sequence that allows tuning ground-based equalizers, but the error rate is typically measured using large, power-consumptive test equipment.

SUMMARY OF THE INVENTION

In accordance with a first aspect of the invention, an apparatus for estimating an error rate in a digital communication system is provided. The apparatus comprises a demodulator for converting a received signal at a first time into a first sample and for converting the received signal at a second time into a second sample. The first sample includes a first bit digitally representing the received signal at the first time, and the second sample includes a second bit digitally representing the received signal at the second time. Further, a delay unit is used to store the first bit. Still further, an inverter is used to invert the state of the bit. The apparatus further includes an exclusive-or unit for determining an exclusive-or result based on the second bit and the first bit after the first bit is delayed by the delay unit and inverted by the inverter. An averaging unit is employed to determine a moving average based in part on the exclusive-or result. The apparatus converts the moving average to a digital error rate estimation using an analog-to-digital converter.

The digital communication system may be a satellite system, and the demodulator may be a phase shift key demodulator. The demodulator may also be an amplitude demodulator, or may employ adaptive equalization. The first bit may be the least significant bit of the first sample, and the second bit may be the least significant bit of the second sample. In any of the foregoing, the averaging unit may comprise a low pass filter. An amplifier may be provided for increasing the level of the moving average prior to conversion by the analog-to-digital converter. In such an instance, the amplifier may be a logarithmic amplifier.

In accordance with a further aspect of the invention, a method for estimating an error rate in a digital communication system is provided. The method begins by converting a received signal at a first time into a first sample. The first sample includes a first bit digitally representing the received signal at the first time. The first bit is stored and inverted, and the received signal is converted at a second time into a second sample. The second sample includes a second bit digitally representing the received signal at the second time. An exclusive-or result is determined based on the first and second bits after the first bit is delayed by the delay unit and inverted by the inverter. A moving average is determined based in part on the exclusive-or result. The moving average is converted to a digital error rate estimation.

The digital communication system described in the preceding paragraph may be implemented as a satellite communications system. The received signal may be a square wave, and the step of converting the received signal into first and second samples includes demodulating the signal using a phase shift key demodulator. In such an instance, the phase shift key demodulator may comprise an eight phase shift key demodulator.

The method may also include adaptive equalization step. The first bit may be the least significant bit of the first sample and the second bit may be the least significant bit of the second sample. The step of determining a moving average may include low pass filtering. The method may also include a step whereby the level of the moving average is amplified. In such an instance, the step of amplifying may be implemented using a logarithmic algorithm.

BRIEF DESCRIPTION OF THE DRAWINGS

These and other features and advantages of the present invention will become more apparent from a detailed consideration of the following detailed description of certain preferred embodiments when taken in conjunction with the drawings in which.

DETAILED DESCRIPTION OF THE PREFERRED EMBODIMENTS

Although the following description focuses on error rate estimation in a satellite system, persons of ordinary skill in the art will readily appreciate that the techniques of the present invention are in no way limited to satellite systems. On the contrary, any system which might benefit from error rate estimation may employ the techniques shown herein. Such systems might include, but are not limited to cellular phone systems, computer network systems, and other wireless communication systems. Further, persons skilled in the art will readily appreciate that other elements, such as digital signal processors and/or application specific integrated circuits could be employed to embody the present invention.

The present invention is preferably embodied in a wireless communication system. The wireless communication system is preferably implemented using the uplink and airlink facilities of a broadband digital satellite demodulation/remodulation relay system. The present invention relates in general to a method and apparatus for estimating error rates in digital communication systems.

At a satellite ground station or a user satellite, remote sensing, video and audio signals may be digitized in known manners, multiplexed with other data signals, compressed (if required), mated with error correction codes, modulated on a carrier, and transmitted to a demod-remod relay satellite. The relay satellite demodulates the received signal to recreate a facsimile of the transmitted data and remodulates the data onto a second carrier frequency for reception by a ground-based receiver station. The ground stations include an antenna, which preferably is in the form of a satellite dish, along with a receiver. The antenna feeds the received satellite signal to the receiver which recovers the originally transmitted data.

Figure 1:
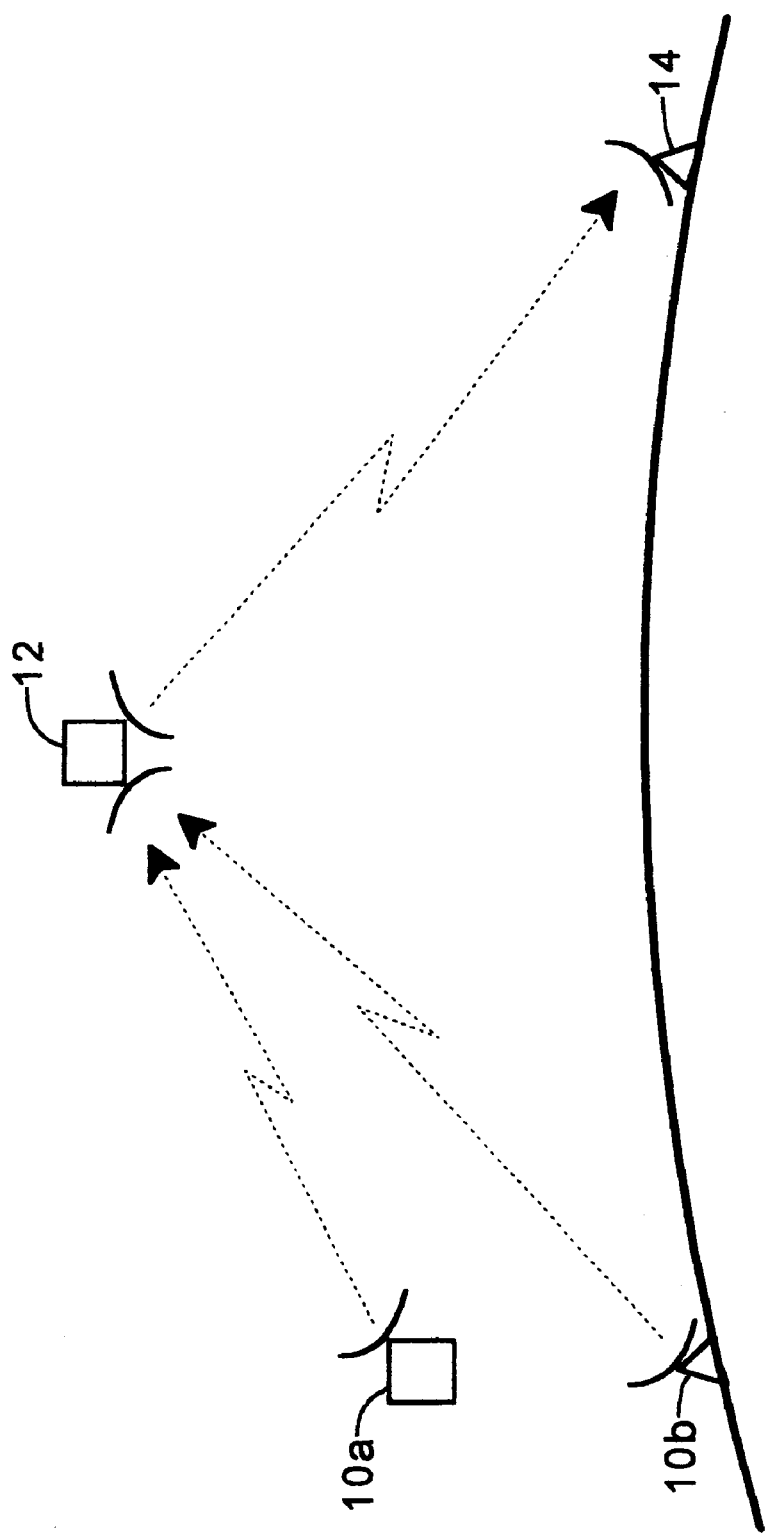
FIG. 1 is a block diagram of a satellite transmission system capable of implementing the method and embodying the apparatus of the present invention.

FIG. 1 is a block diagram of a transmission, relay, and reception system embodying features of the present invention. The illustrated system includes a transmission station 10, a relay 12, and a receiver station 14. A wireless airlink provides the communications medium between the transmission station 10, the relay 12, and the receiver station 14. The transmission station 10 is preferably a user satellite 10a, but may be a ground based station 10b. The relay 12 is preferably a satellite. The receiver station 14 includes a satellite reception antenna/dish and decoding circuitry.

In operation, the transmission station 10 can receive video, audio and data signals from a number of sources, including satellites, mobile terminals, terrestrial fiber optics, and cable. In a conventional manner, the encoded data stream is modulated and sent through a frequency converter which converts the modulated encoded data stream to a frequency band suitable for reception by the relay 12. The modulated, encoded data stream is then routed from the frequency converter to a satellite antenna/dish where it is broadcast toward the relay 12 over the airlink. The relay 12 receives and demodulates the modulated/encoded data stream then remodulates and re-broadcasts it downward toward an area on earth that includes the receiver stations 14. In the preferred embodiment, the transmission station 10 transmits a predetermined pattern (e.g., a square wave) during error rate estimation.

Figure 2:
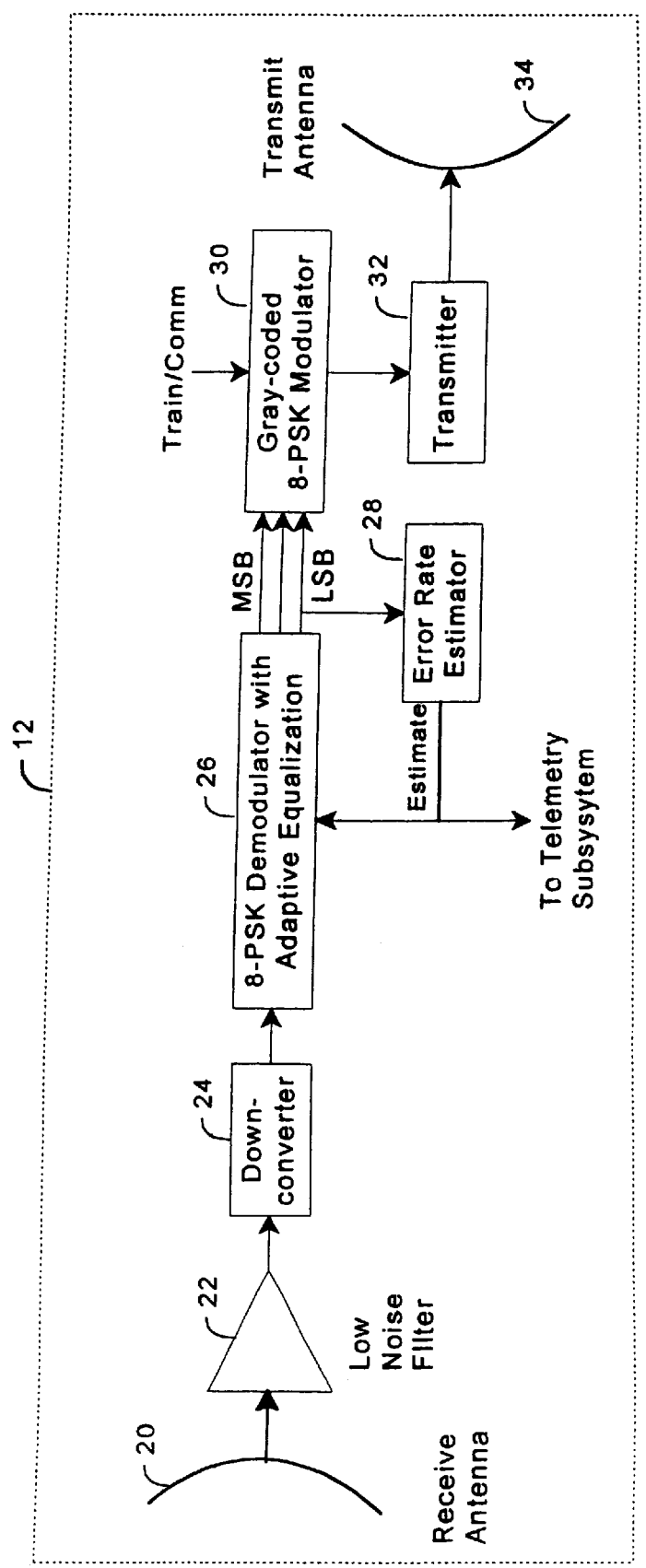
FIG. 2 is a block diagram showing more details of a relay satellite, suitable for use as the relay satellite depicted in FIG. 1.

FIG. 2 illustrates a relay satellite, suitable for use as the relay satellite depicted in FIG. 1. A receive antenna 20 captures a radio signal which is filtered and amplified by a band pass filter and a low noise amplifier in a known manner. The frequency of the filtered signal is then stepped down by a down converter 24 in a known manner. Subsequently a demodulator 26 recovers the original signal. An error rate estimator 28 receives its input from the demodulator 26. In the preferred embodiment, the error rate estimate is returned to an equalizer within the demodulator 26, thereby allowing the on-board equalizer to tune the demodulator 26 for a minimum error rate. The error rate estimate may also be multiplexed into the spacecraft telemetry system. Once received by the receiver station 14, the telemetered error rate information can be used to monitor link quality or to tune distortion mitigation at the source terminal (10a, 10b) or on the relay 12. Typically, this tuning will be a slow process due to transmission delays. However, in the preferred embodiment of the present invention, this tuning is only performed during initialization and infrequent maintenance of the system. Significantly, in the preferred embodiment, the least significant bit of the demodulated data is used as an input to the error rate estimator 28 as discussed below. To complete the relay operation, the recovered data is encoded by a gray-coded eight phase shift keying modulator 30 and transmitted via a transmitter 32 and a transmit antenna 34 in a known manner. Of course, the receive antenna 20 and the transmit antenna 24 may be shared by a single physical apparatus.

Figure 3:
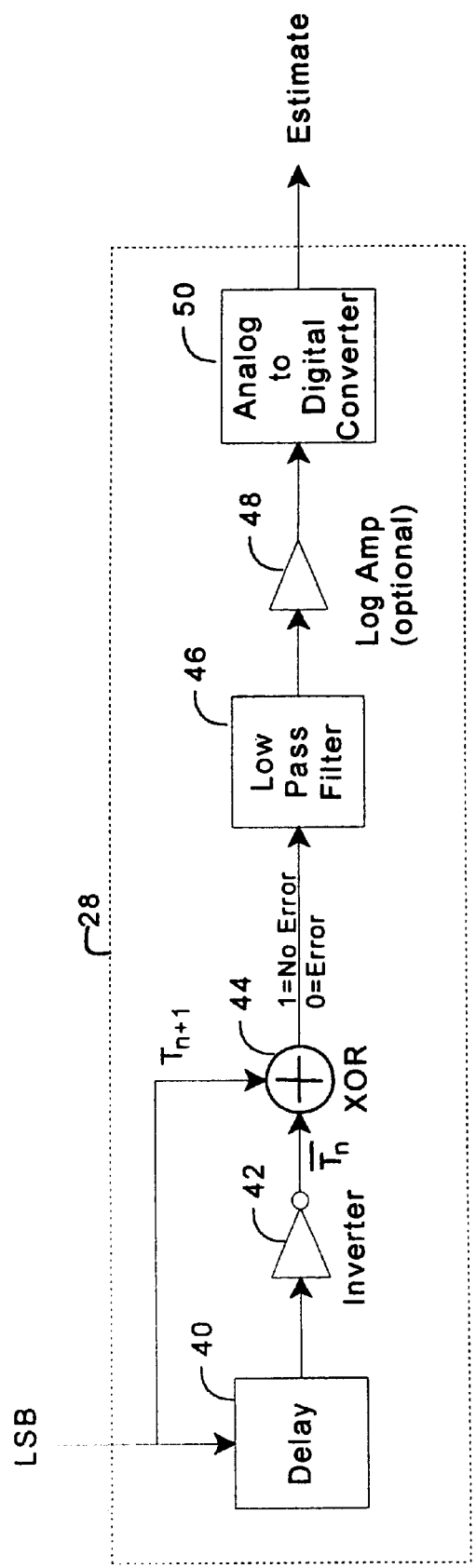
FIG. 3 is a block diagram showing an error rate estimator, suitable for use as the error rate estimator depicted in FIG. 2; and, FIG. 4 is a flow chart illustrating a method for estimating an error rate in accordance with the teachings of the present invention.

FIG. 3 further illustrates the error rate estimator 28. During error rate estimation, the data to be relayed consists of a known pattern, such as a square wave. After demodulation of the data to be relayed, one or more bits of the data is sent to the error rate estimator 28. In the preferred embodiment only the least significant bit (LSB) of the data is required by the error rate estimator 28, because the LSB error rate is approximately one-half of the overall symbol error rate. Therefore, the LSB error rate is proportional to the symbol error rate and no additional information is required to estimate the overall error rate. Of course, any bit or bits, including all bits, could be sent to the error rate estimator 28 to increase the accuracy of the estimate at the expensive of circuit complexity and/or processing power required to complete the estimate. Further, multiple bits could be sent to the error rate estimator 28 with only a subset of the bits processed. In this manner, the trade off described above could be made dynamically.

Each bit sent to the error rate estimator 28 enters a delay 40. In the preferred embodiment, the delay 40 stores each bit until the next bit arrives. The delay 40 may be implemented in a variety of know manners. For example, in a preferred embodiment, the delay 40 could be implemented using a flip-flop configured from semiconductor gates. Alternatively, some or all of the error rate estimator 28 could be embodied in a microprocessor executing a software program. In such an instance, the delay 40 could be implemented using software instructions to store and retrieve the bits to and from a memory device at appropriate intervals.

After the delay 40, each bit is inverted by an inverter 42. Like the delay 40, the inverter 42 may be implemented in a variety of know manners. For example, in a preferred embodiment, the inverter 42 could be implemented using a semiconductor gate. Alternatively, some or all of the error rate estimator 28 could be embodied in a microprocessor executing a software program. In such an instance, the inverter 42 could be implemented using software instructions to complement each bit. In one embodiment, the inverter also provides the delay required. In such an instance, the delay 40 is omitted.

Subsequently, the inverted bit is exclusive-ored (XOR) with the next bit in the data sequence. For example, in the preferred embodiment the least significant bit stream transmitted by the transmission station 10 consists of a square wave during bit error rate estimation (i.e., . . . 010101 . . . ). Therefore, under error free conditions, if the value of the delayed bit at time $T_0$ is zero, then the value of the delayed/inverted bit is one, and the value of the next (non-delayed and non-inverted) bit at $T_1$ is also one. More generically, the two inputs to the exclusive-or 44 are $\sim T_N$ and $T_{N+1}$. If no error has occurred, the delayed/inverted bit will be equal to the next bit ($\sim T_N = T_{N+1}$). In such an instance, the output of the exclusive-or 44 will be one. However, if a bit error has occurred, the delayed/inverted bit will not be equal to the next bit ($\sim T_N \neq T_{N+1}$). In such a case, the output of the exclusive-or 44 will be zero.

The exclusive-or 44 may be implemented in a variety of know manners. For example, in a preferred embodiment, the exclusive-or 44 could be implemented using a semiconductor gate. Alternatively, some or all of the error rate estimator 28 could be embodied in a microprocessor executing a software program. In such an instance, the exclusive-or 44 could be implemented using software instructions.

By averaging the output of the exclusive-or 44 an analog representation (i.e., a moving average) of the error rate is produced. For example, an exclusive-or 44 output of 1111101111 would indicate a 10% error rate. Accordingly, the exclusive-or 44 output is sent to an averaging unit 46 to perform the averaging. In the preferred embodiment, the averaging unit 46 comprises a low pass filter. Alternatively, the averaging unit 46 could comprise a processor executing software instructions. For example, a digital signal processor is well suited for this and other tasks associated with the present invention.

The analog estimate produced by the averaging unit 46 may optionally be processed by a amplifier 48. In the preferred embodiment the amplifier 48 comprises a logarithmic amplifier. The analog estimate (with or without amplification) is then converted to a digital signal by a analog-to-digital converter 50 in a known manner. The result is a digital representation of the error rate estimate.

Figure 4:
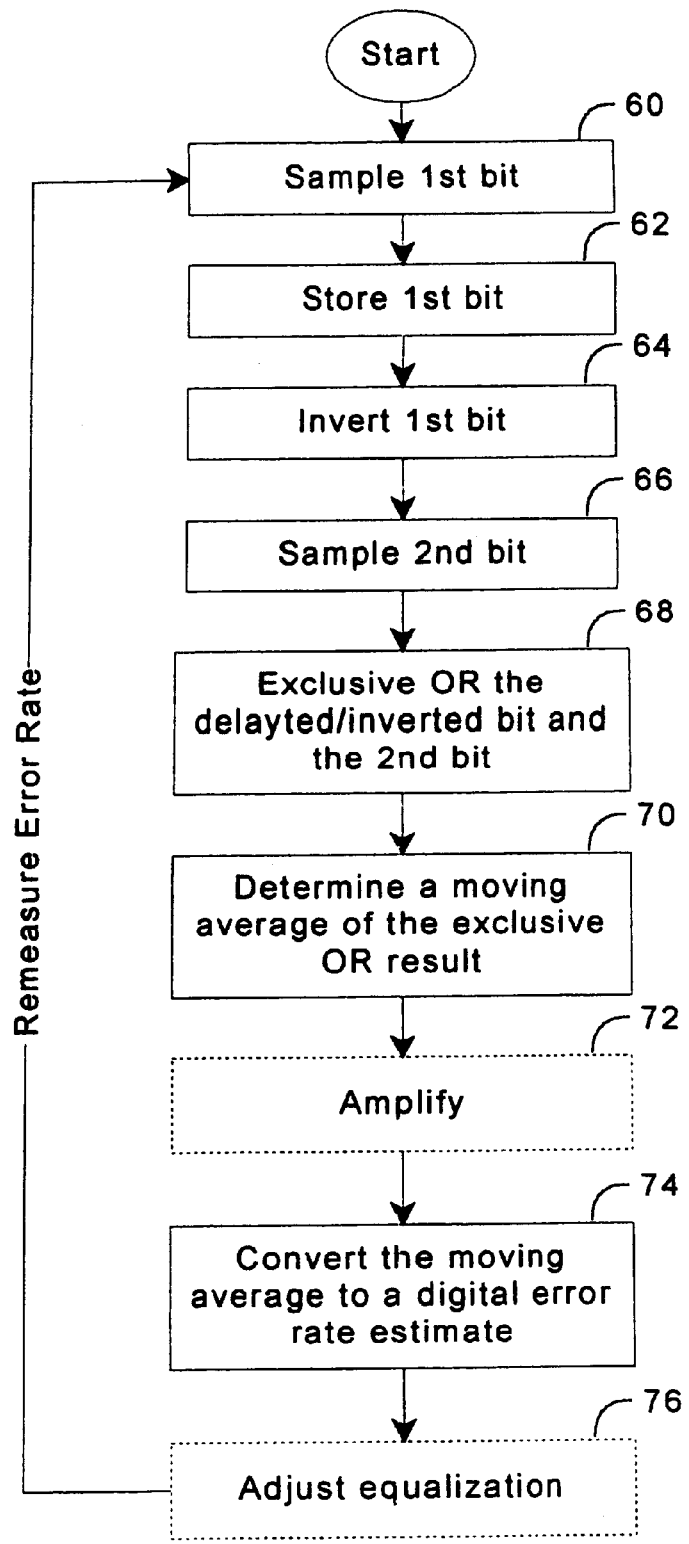

A flowchart of a program that can be implemented by the error rate estimator 28 to estimate an error rate in accordance with the teachings of the present invention is illustrated in FIG. 4. The programmed steps are typically performed by a control circuit such as a microprocessor as is conventional. Once the program is initiated the control circuit samples an incoming signal in a known manner (step 60). In the preferred embodiment, three bits are sampled, however any number of bits could be sampled in accordance with the teachings of the present invention. Further, in the preferred embodiment, only the least significant bit (LSB) of the data is required by the error rate estimator 28, because the LSB error rate is approximately one-half of the overall symbol error rate. Therefore, the LSB error rate is proportional to the. symbol error rate and no additional information is required to estimate the overall error rate. Of course, any bit or bits, including all bits, could be sent to the error rate estimator 28 to increase the accuracy of the estimate, potentially at the expensive of the processing power required to complete the estimate. Further, multiple bits could be sent to the error rate estimator 28 with only a subset of the bits processed. In this manner, the trade off described above could be made dynamically.

Subsequently, the sample is stored (block 62) and inverted (block 64). Each of these functions may be performed in a conventional manner using a microprocessor and memory executing software instructions. By storing the sample until the next sample is taken, the signal is effectively delayed.

Accordingly, after a predetermined time period (e.g., one-half the period of the test pattern square wave) a second sample is taken (step 66). The delayed and inverted first sample is then compared to the second sample (step 68). In a preferred embodiment, the comparison comprises exclusive-oring the delayed and inverted first sample with the second sample in a known manner. If no error has occurred, the delayed and inverted first sample will be the same as the second sample (i.e., both logic one or both logic zero). Accordingly, the exclusive-or comparison (step 68) will produce a logic zero result, indicating that no error has occurred. Conversely, if an error has occurred, the two bits compared will be different and the output of the exclusive-or (step 68) will be a logic one.

Preferably, over a predetermined period of time a predetermined number of iterations of the above error determination steps occur. In other words, a string of ones and zeros indicating error/no error respectively is produced by the exclusive-or function (step 68). In order to convert this string into a single error rate estimate, a moving average is determined in a known manner (step 70). For example, a low pass filter could be employed to perform such a moving average function. Subsequently, the moving average is optionally amplified (step 72) converted to a digital error rate estimate if necessary (step 74). For example, a well known analog-to-digital converter could be used to perform the conversion. Alternatively, step 70 and step 74 could be performed together. For example, a software program executing in a microprocessor could sum the results over a predetermined number of samples and divide by the number of predetermined number of samples, thereby producing a digital representation of a moving average. In such an instance amplification (step 72) may not be necessary. Optionally, the error rate estimate is used by an equalization adjustment step 76. The equalization adjustment step 76 tunes the demodulator 26 for a minimum error rate. Subsequently, the error rate is remeasured.

In summary, persons of ordinary skill in the art will readily appreciate that a method and apparatus for estimating an error rate in a digital communication system has been provided. Systems implementing the teachings of the invention can enjoy significantly improved link performance by adjusting for optimal bit error rates. As a result, smaller transmitters and/or antennas may be used, thereby saving space and cost. Further, systems implementing the present invention are burdened by very little additional hardware or power usage, because the system is normally not operating.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. An apparatus for estimating an error rate in a digital communication system comprising:
    a demodulator for converting a received signal at a first time into a first sample and at a second time into a second sample, the first sample including a first at least one bit digitally representing the received signal at the first time and the second sample including a second at least one bit digitally representing the received signal at the second time;
    a delay unit for storing the first at least one bit;
    an inverter for inverting the state of the at least one bit;
    an exclusive-or unit for determining an exclusive-or result based on the second at least one bit and the first at least one bit after the first at least one bit is delayed by the delay unit and inverted by the inverter;
    an averaging unit to determine a moving average based in part on the exclusive-or result; and,
    an analog-to-digital converter for converting the moving average to a digital error rate estimation.

2. An apparatus as defined in claim 1, wherein the digital communication system comprises a satellite system.

3. An apparatus as defined in claim 1, wherein the demodulator comprises a phase shift key demodulator.

4. An apparatus as defined in claim 1, wherein the demodulator comprises an amplitude demodulator.

5. An apparatus as defined in claim 1, wherein the demodulator comprises a phase shift key and amplitude demodulator.

6. An apparatus as defined in claim 1, wherein the demodulator employs adaptive equalization.

7. An apparatus as defined in claim 1, wherein the first at least one bit comprises the least significant bit of the first sample and the second at least one bit comprises the least significant bit of the second sample.

8. An apparatus as defined in claim 1, wherein the averaging unit comprises a low pass filter.

9. An apparatus as defined in claim 1, further comprising an amplifier for increasing the level of the moving average prior to conversion by the analog-to-digital converter.

10. An apparatus as defined in claim 9, wherein the amplifier comprises a logarithmic amplifier.

11. A method for estimating an error rate in a digital communication system comprising:

- converting a received signal at a first time into a first sample, the first sample including a first at least one bit digitally representing the received signal at the first time;
- storing the first at least one bit;
- inverting the at least one bit;
- converting the received signal at a second time into a second sample, the second sample including a second at least one bit digitally representing the received signal at the second time;
- determining an exclusive-or result based on the second at least one bit and the first at least one bit after the first at least one bit is delayed by the delay unit and inverted by the inverter;
- determining a moving average based in part on the exclusive-or result; and,
- converting the moving average to a digital error rate estimation.

12. A method as defined in claim 11, wherein the digital communication system comprises a satellite system.

13. A method as defined in claim 11, wherein the received signal comprises a square wave.

14. A method as defined in claim 11, wherein the steps of converting the received signal into a first and second samples comprises demodulating the signal using a phase shift key demodulator.

15. A method as defined in claim 14, wherein the phase shift key demodulator comprises an eight phase shift key demodulator.

16. A method as defined in claim 11, further comprising the step of adaptive equalization.

17. A method as defined in claim 11, wherein the first at least one bit comprises the least significant bit of the first sample and the second at least one bit comprises the least significant bit of the second sample.

18. A method as defined in claim 11, wherein the step of determining a moving average comprises low pass filtering.

19. A method as defined in claim 11, further comprising the step of amplifying the level of the moving average.

20. A method as defined in claim 19, wherein the step of amplifying comprises logarithmically amplifying.

* * * * *